Dec. 25, 1956   O. E. BROWN ET AL   2,775,469
SPLIT PIPE SLEEVE WITH MEANS TO PREVENT INCORRECT ASSEMBLY
Filed July 31, 1953                                5 Sheets-Sheet 1

INVENTORS
Oscar E. Brown
Hugh L. Baker

BY Cushman, Darby + Cushman
ATTORNEYS

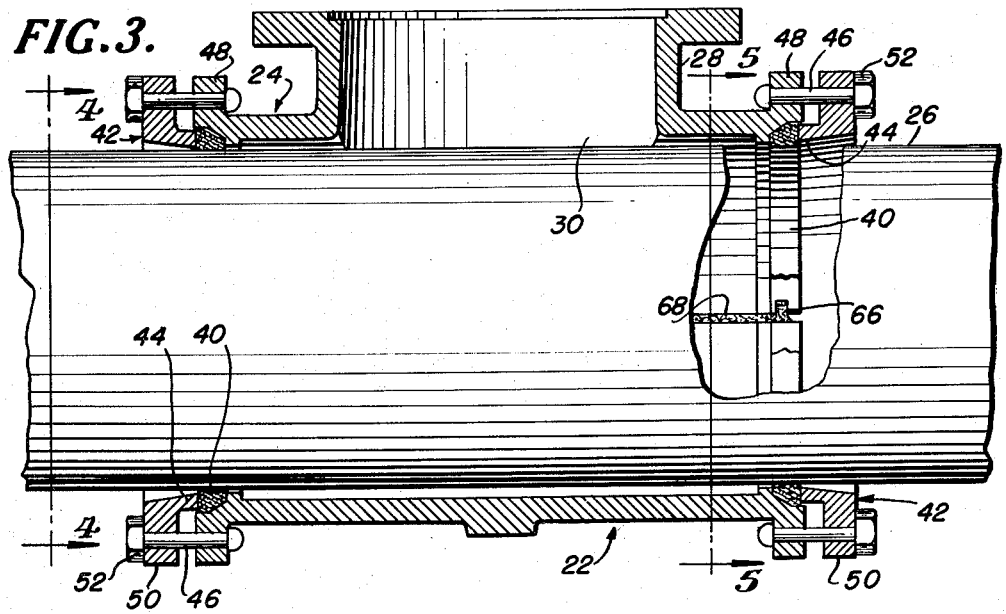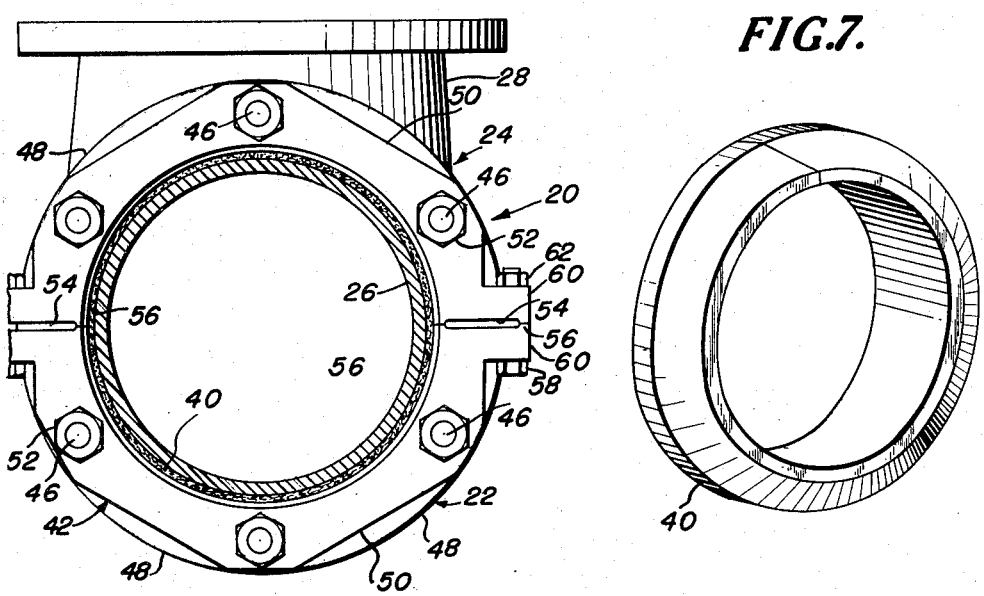

Dec. 25, 1956  O. E. BROWN ET AL  2,775,469
SPLIT PIPE SLEEVE WITH MEANS TO PREVENT INCORRECT ASSEMBLY
Filed July 31, 1953  5 Sheets-Sheet 4

INVENTORS
Oscar E. Brown
Hugh L. Baker
BY Cushman, Darby & Cushman
ATTORNEYS

Dec. 25, 1956  O. E. BROWN ET AL  2,775,469
SPLIT PIPE SLEEVE WITH MEANS TO PREVENT INCORRECT ASSEMBLY
Filed July 31, 1953  5 Sheets-Sheet 5
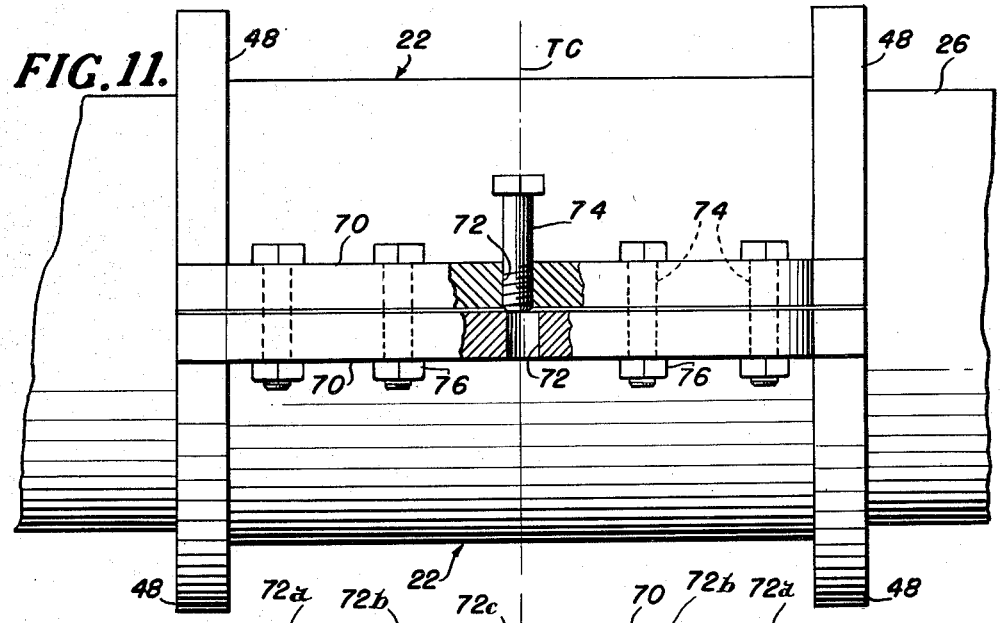
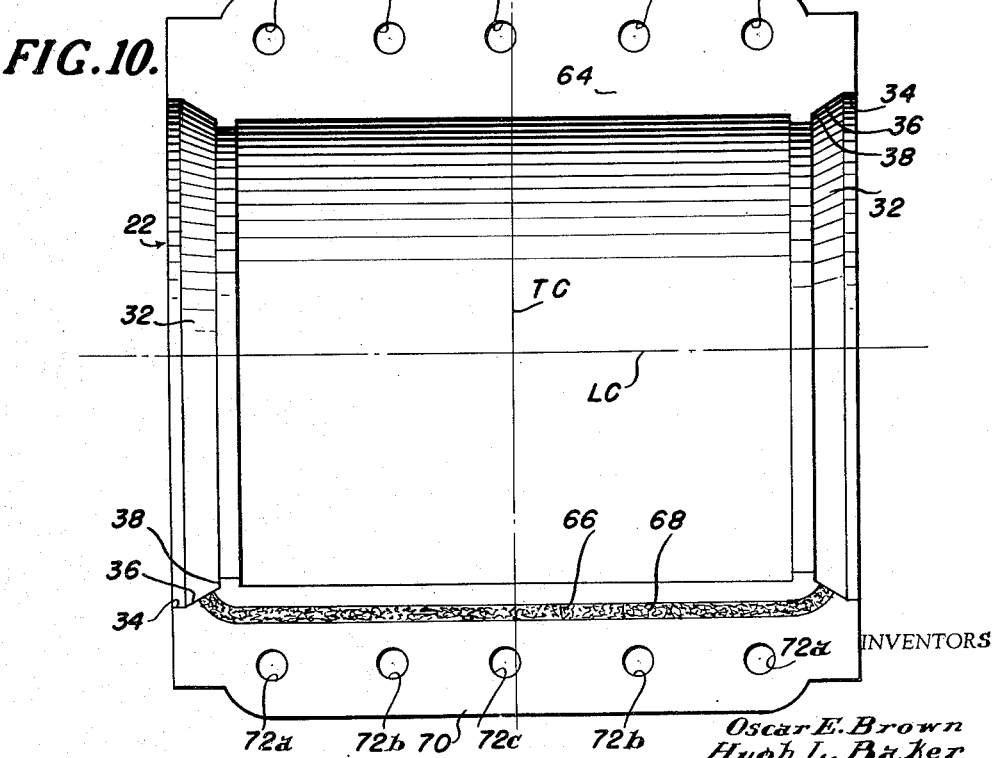
INVENTORS
Oscar E. Brown
Hugh L. Baker
BY Cushman, Darby & Cushman
ATTORNEYS

United States Patent Office 2,775,469
Patented Dec. 25, 1956

2,775,469

SPLIT PIPE SLEEVE WITH MEANS TO PREVENT INCORRECT ASSEMBLY

Oscar E. Brown, Chattanooga, Tenn., and Hugh L. Baker, Decatur, Ill., assignors to Mueller Co., Decatur, Ill., a corporation of Illinois Application July 31, 1953, Serial No. 371,472

3 Claims. (Cl. 285—18)

This invention relates to split pipe sleeves, and more particularly to split pipe sleeves having two semicircular sections adapted to be bolted together along their longitudinal edges about a pipe.

For the purpose of repairing a leak in a pipe, a sleeve of this nature is used which has two imperforate sections. For drilling or tapping a pipe in order to connect a lateral or main thereto, or for other purposes, a sleeve is used which has one of its sections provided with a lateral or radial outlet having an exterior tubular extension or boss that usually is provided with a circumferential flange at its outer end for bolting another element, such as a valve or the like, thereto. An imperforate section of a split pipe sleeve of the type under consideration is usually termed a "back half," while a section having a lateral outlet is termed a "front half."

Both of the aforedescribed types of sections are provided with an uninterrupted sealing surface along one of their side edges, while the other edge is provided with a longitudinal groove having packing material secured therein. When two sections are assembled in embracing relationship with a pipe, they are arranged so that the packing is on opposite sides of the pipe in order for the longitudinal packing in each section to sealingly engage the uninterrupted sealing surface of the other section. Additional packing arrangements are also employed at both ends of the sleeve to seal the end spaces between the sleeve and the pipe.

Each sleeve section is provided with longitudinal side flanges which are adapted to be bolted to corresponding side flanges on another section. In order to effect manufacturing economies, it is highly desirable to construct both types of halves or sections so that a back and a front half can be used together to form a tapping sleeve, so that two identical back halves can be used together to form a repair sleeve, and so that two front halves can be used together to form a tapping sleeve or cross by means of which a pipe or main can be tapped on opposite sides.

For the above reasons, the bolt holes in the side flanges of both front halves and back halves have heretofore been arranged identically and symmetrically with respect to both the longitudinal and transverse center lines of each half or section. By means of this arrangement or pattern of the bolt holes, a single half of either type can be used with another like half or two dissimilar halves can be used together to form a split pipe sleeve. The symmetrical arrangement of the bolt holes, however, permits an incorrect assembly of two halves, in that the longitudinal packing on two halves may be disposed in abutting relationship while the uninterrupted sealing surfaces on the longitudinal edges of the two halves are in similar abutting relationship.

Such incorrect assembly of the two halves of a split sleeve frequently occurs with the unskilled labor usually employed to assemble split pipe sleeves of this type. Further, the incorrect assembly of the halves of a split pipe sleeve usually is not self-evident except upon careful inspection. Accordingly, sleeve sections frequently have been incorrectly assembled about a pipe and bolted together, the end packings installed, and the main or pipe tapped through the lateral outlet with resulting leakage between the two abutting side edge sealing surfaces where no packing is interposed therebetween. Such a situation can be awkward to say the least, because pipes or mains frequently are tapped at locations remote from a shut-off valve and leakage continues to occur without any remedy whatever until the remote shut-off valve has been closed. If a pipe or main carrying gas or oil is so tapped, the hazard is obvious.

Accordingly, it is an object of this invention to provide split pipe sleeve sections of the type under consideration with means for readily and obviously indicating when they are incorrectly assembled about a pipe.

It is another object of this invention to provide split pipe sleeve sections with means for precluding their incorrect assembly and the complete installation of a sleeve comprising such sections on a pipe.

It is another object of this invention to provide split pipe sleeve sections of the type under consideration with means for positively preventing installation of the end packing of a sleeve comprising such sections when the latter are incorrectly assembled about a pipe.

It is a further object of this invention to provide sleeve sections of the type under consideration with means for positively preventing the insertion of all of the bolts in the side flanges of two such sections in the event that the latter are incorrectly assembled about a pipe.

Other objects and advantages of the invention will be apparent from the following description and accompanying drawings, in which:

Figure 3 is a longitudinal sectional view taken on line 3—3 of Figure 2. Portions are broken away to illustrate details.

Figure 4 is an end view taken on line 4—4 of Figure 3.

Figure 7 is a perspective view of the end packing shown in Figure 3.

Figure 10 is a view corresponding to Figure 6 but illustrating a modified form of the invention.

Figure 11 is a side elevational view illustrating the incorrect assembly of two back half sections of the type shown in Figure 10.

Figure 1:
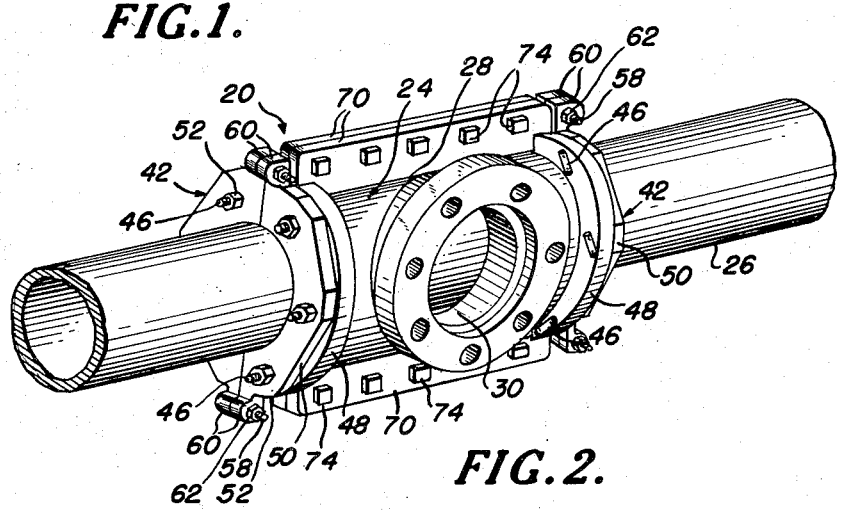
Figure 1 is a perspective view of a split tapping sleeve embodying this invention and shown in operative embracing relationship with a section of a pipe.

Referring now to the drawings, there is shown in Figures 1 to 5 a mechanical joint tapping sleeve embodying this invention and comprising a back half 22 and a front half 24. The two halves 22 and 24 are assembled in embracing relationship with a pipe 26 with their abutting side edges sealed by packing, later described. Other packing, later described, is also interposed between the pipe 26 and the assembled sleeve 20 at the opposite ends thereof so that the pipe can be tapped, as is well known in the art, by an appropriate enclosed drilling machine (not shown) secured in operative position to the flanged boss or tubular extension 28 surrounding the lateral outlet 30 of the front half. The tapping of a pipe in this manner frequently is desirable in order to run a lateral extension therefrom, or for other purposes, as is well known in the art.

The ends of both halves 22 and 24 are provided with circumferentially extending packing recesses 32 (Figure 6) having an outer cylindrical section 34 followed by an inwardly tapering section 36 that terminates in an inner shoulder 38. A packing ring 40, which is split for assembly about the pipe 26 as shown in Figure 7, is disposed in each recess 32 and is complementary thereto. The packing ring 40 is compressed in its recess 32, into tight sealing engagement with the walls thereof and with the periphery of the pipe 26, by a split follower ring 42 (Figure 3) having an axially-extending flange 44 for abutting engagement with the packing ring. The ring 42 is forced against the packing 40 by means of T-head bolts 46 extending through circumferential end flanges 48 on the two halves 22 and 24 and through a circumferential flange 50 on the follower ring. Nuts 52 threaded onto the outer ends of the bolts 46 serve to draw the ring 42 tightly against the packing 40 to effect a tight seal.

The follower ring 42 preferably is cast as an integral ring having diametrically-opposed weakened portions formed by radially-elongated apertures 54 (Figure 4) which leave radially-spaced weak sections, as at 56. In use, the ring is broken into two parts by fracturing the same at the weak sections 56 to thereby achieve a perfect mating of the two parts of the ring 42 when they are assembled about a pipe. Additional strength and rigidity are imparted to the ring 42, after its assembly, by bolts 58 which pass through radial lugs 60 adjacent both ends of each ring part and have nuts 62 threaded thereon.

This packing arrangement at each end of the sleeve 20 is termed a "mechanical joint," which is well known in the art and forms no part of this invention.

Figure 5:
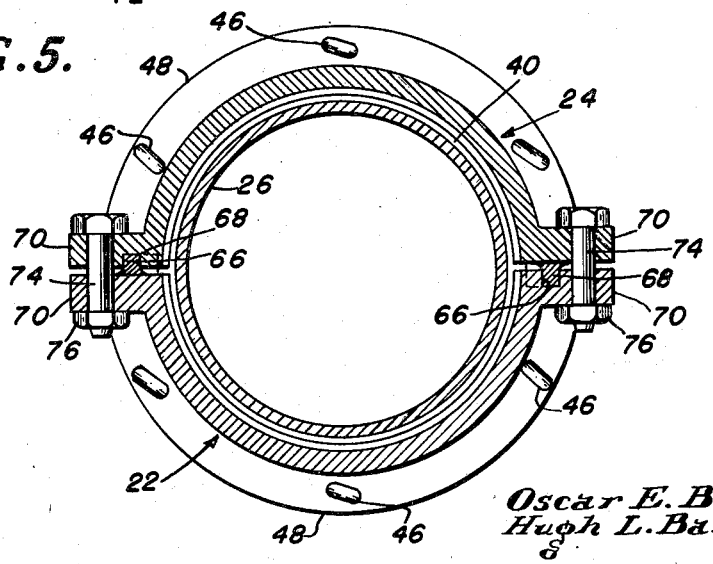
Figure 5 is a transverse sectional view taken on line 5—5 of Figure 3.
Figure 8:
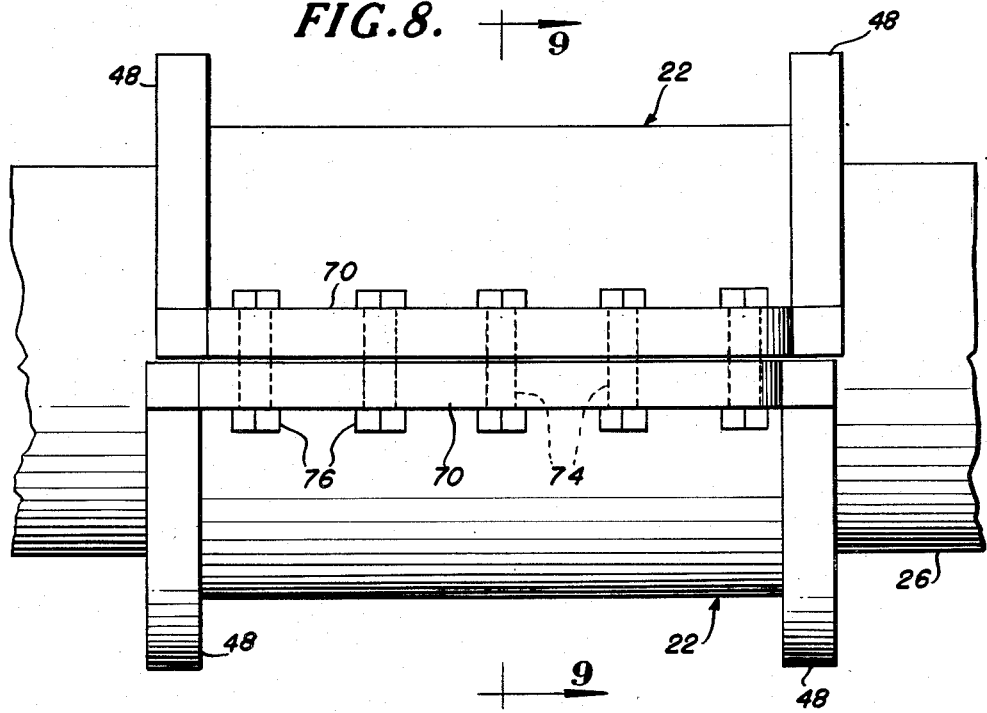
Figure 8 is a side elevational view illustrating the incorrect assembly of two back half sections of a split pipe sleeve embodying this invention.
Figure 9:
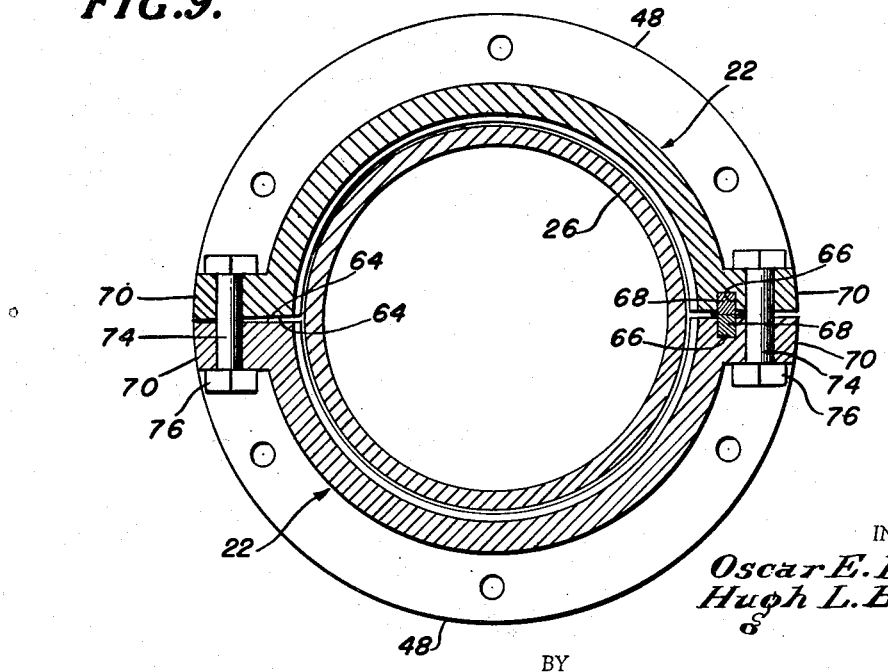
Figure 9 is a transverse sectional view taken on line 9—9 of Figure 8.

One side edge of each sleeve half 22 and 24 is provided with an uninterrupted sealing surface 64 (Figure 6) which extends the length of the half, while the other edge of the same half is provided with a longitudinal groove 66 which opens, at its opposite ends, into the packing recesses 32 at both ends of the half. Resilient packing 68, usually rubber or a similar packing material, is secured in the groove 66, as by a forced fit, and protrudes somewhat therefrom, as is best shown in Figure 5. In assembling two halves 22 and/or 24 about a pipe, the longitudinal packing 68 on one half is abutted against the uninterrupted sealing surface 64 on the side edge of the other half, as is also best shown in Figure 5.

By means of this construction, wherein each half 22 and 24 is provided with edge packing along only one side thereof, a back half 22 can be assembled with another identical back half to form a repair sleeve, or two identical front halves 24 can be assembled about a pipe to form a cross (not shown) so that the pipe can be tapped on opposite sides thereof. Accordingly, the aforementioned side edge sealing construction affords considerable manufacturing economies, in that it is unnecessary to make two different types of back halves, or two different types of front halves.

Both front and back halves 24 and 22 are provided with longitudinal side flanges 70 having a longitudinal series of bolt holes 72 (Figure 6) therein so that two halves can be secured together about a pipe by bolts 74 which pass through opposed side flanges 70 and have nuts 76 threaded thereon. It can readily be seen that in order for two like halves, or a front half 24 and a back half 22, to be bolted together properly about a pipe, the bolt holes 72 of the assembled halves must be in registry. Such registration is accomplished for two like halves only by having identical bolt hole patterns in the two side flanges 70 of both front and back halves. Further, the bolt hole patterns on the two flanges 70 of any one half must be symmetrically arranged with respect to the longitudinal centerline LC (Figure 6) of the half.

In split pipe sleeves prior to this invention (not shown), the bolt hole pattern in each side flange of a half comprised a longitudinal line of equally-spaced holes, which line was symmetrically arranged with respect to the transverse centerline of the half. In other words, where there were an odd number of bolt holes in each flange, the transverse centerline of a half bisected the central bolt hole on both side flanges, or where there were an even number of bolt holes, the centerline passes midway between the two central bolt holes in each flange.

Because of the above-described prior art construction, it was possible to incorrectly assemble two halves so that the side edge packing on one half abutted the side edge packing on the other half on one side of the pipe, while on the other side of the pipe the uninterrupted edge sealing surfaces of the two halves were disposed in abutting relationship with no packing therebetween. It can readily be seen that, because the longitudinal edge packings 68 are relatively thin when compressed, the incorrect assembly of the two halves about a pipe is not readily detectable, especially by the unskilled labor usually employed for assembling a pipe sleeve in the field. Consequently, prior art sleeves frequently are completely installed about a pipe and the latter tapped with resulting leakage between the abutting uninterrupted edge sealing surfaces of the two halves. The frequency of occurrence of such incorrect assembly and the disadvantageous results flowing therefrom have been described in detail heretofore, making repetition unnecessary.

Figure 2:
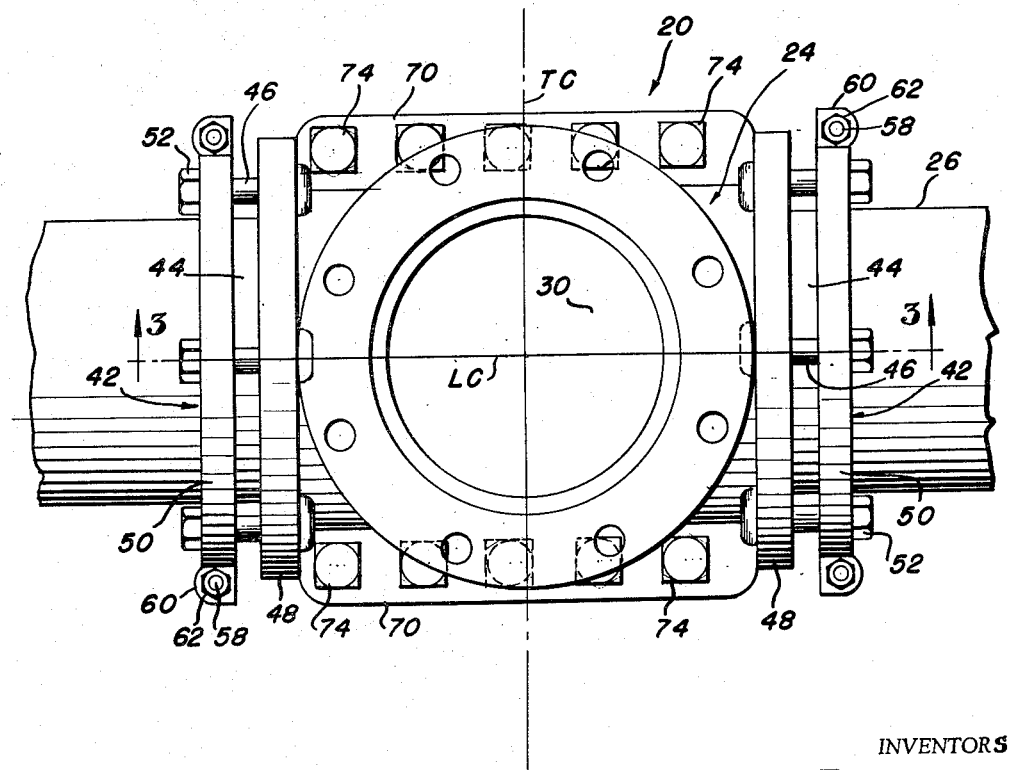
Figure 2 is an elevational view of the tapping side of the split sleeve shown in Figure 1.
Figure 6:
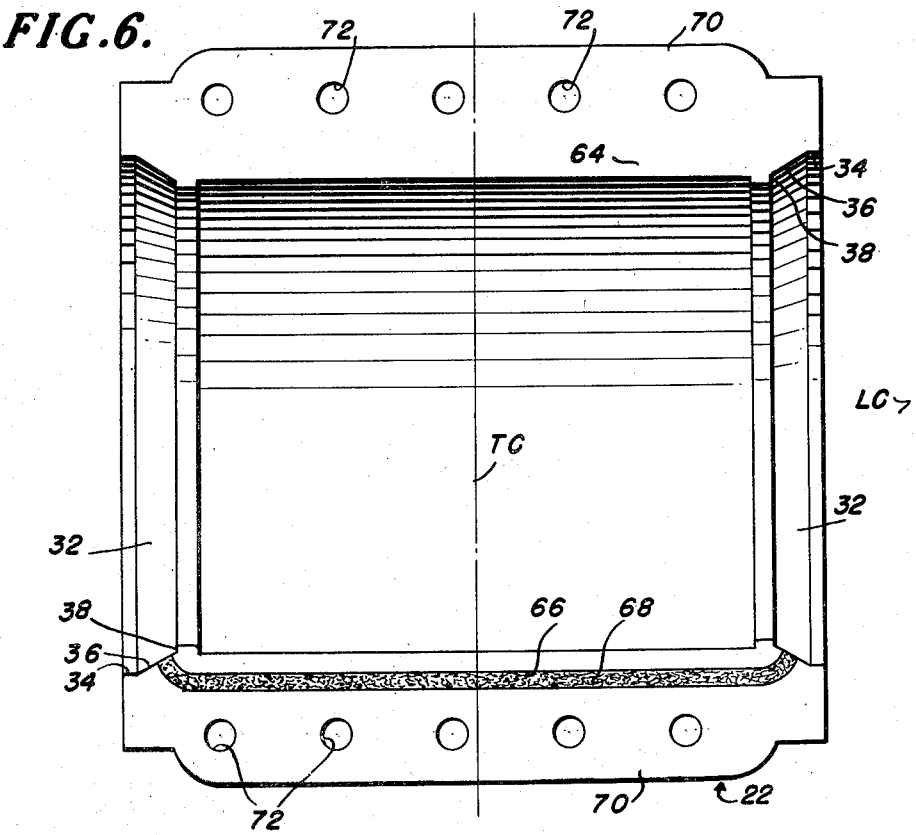
Figure 6 is an interior view of the back half of the split sleeve shown in Figure 1.

In order to overcome the above-described possibility of incorrect assembly of two halves, this invention provides bolt hole patterns which preclude such incorrect assembly. In the modification of this invention shown in Figures 1 to 9, the bolt hole patterns in the two flanges 70 of each half 22 and 24 are identical and each comprises a longitudinal line of equally-spaced bolt holes 72, five such holes being shown in the drawings. With this construction, it is obvious that the two bolt hole patterns in each half are symmetrical with respect to the longitudinal centerline LC thereof. Each bolt hole pattern is unsymmetrical with respect to the transverse centerline TC of its half, however, as is best shown in Figures 2 and 6. This result is accomplished by shifting the prior art bolt hole patterns slightly longitudinally of the half, so that in a construction wherein there are an odd number of bolt holes 72 in each flange pattern, the central bolt holes thereof are disposed slightly to one side of the transverse centerline TC of the half, as illustrated in Figure 6. In the event that there are an even number of bolt holes in each flange pattern, the transverse centerline of the half will pass slightly to one side of the midpoint between the two central bolt holes. This construction is not shown since it is deemed unnecessary to illustrate the same.

By means of this construction, it will be seen that when two halves are correctly assembled, as is shown in Figure 5, the two halves will mate perfectly about a pipe. On the other hand, if two halves are incorrectly assembled about a pipe, as shown by the two back halves 22 in Figures 8 and 9, although the corresponding bolt holes 72 in both halves can be disposed in registry so that bolts 74 can be inserted therethrough, it will be seen that the two halves will be offset longitudinally from each other by a small amount. Because of this offset of the two halves, an incorrect assembly will be self-evident even to unskilled laborers. Further, the indication of an incorrect assembly is made even more apparent because end packing rings 40 will not fit smoothly into the packing recesses 32 at the opposite ends of the assembled sleeve nor will these rings 40 be engaged uniformly by follower rings 42. Therefore, in the event that two halves of a sleeve embodying this invention are incorrectly assembled so as to leave one side of the sleeve unsealed, such incorrect assembly will be readily apparent and will lead to the removal and reversal of one of the halves so that it can be reassembled in its correct position with relation to the other half.

Referring now to Figures 10 and 11, there is shown a modification of this invention wherein when two halves are incorrectly assembled it is impossible to insert all of the bolts 74 necessary to secure the two halves together. In this modification, all of the bolt holes 72 in any one half, with the exception of one or more pairs of opposite holes in the two flanges 70, may be arranged in patterns similar to the prior art, in that all but one or more pairs of opposite holes are arranged symmetrically with respect to both the longitudinal and transverse centerlines LC and TC of a half. Thus, for example, as is shown in the back half 22 illustrated in Figure 10, the bolt holes 72 in each flange 70 are arranged in a longitudinal line with the bolt holes 72a on each end of a line being equi-distant from the transverse centerline TC of the half. The next adjacent bolt holes 72b at each end of the line are also equi-distant from the transverse centerline TC and from the holes 72a. The central bolt hole 72c in each line, however, is offset slightly to one side of the transverse centerline TC, so that this central bolt hole is not equi-distant from the adjacent bolt holes 72b on both sides thereof.

Accordingly, it readily can be seen that two halves embodying this pattern arrangement of the bolt holes 72 can be assembled correctly about a pipe so that they will have a seal on both sides of the sleeve. In the event, however, that two halves are incorrectly assembled about a pipe, as illustrated by the back halves 22 in Figure 11, even though eight out of their ten pairs of opposed bolt holes 72 are in perfect registry, two pairs of opposed bolt holes 72c are so far out of registry that a bolt 74 cannot be inserted therethrough. Hence, the incorrect assembly will be so obvious that remedial measures will be taken immediately.

It will thus be seen that the objects of this invention have been fully and effectively accomplished. It will be realized, however, that the specific embodiments illustrated and described for the purpose of disclosing the principles of this invention are subject to change without departing from such principles. Therefore, this invention includes all modifications encompassed by the spirit and scope of the following claims.

We claim:
1. In a substantially cylindrical pipe sleeve divided longitudinally into equal sections of identical edge portion configuration and adapted to embrace a pipe with their side edges in abutting engagement, one abutting edge of each section having a longitudinally extending substantially radially disposed flat sealing surface and the other abutting edge having longitudinally extending packing mounted thereon and projecting slightly therefrom for sealing engagement with the sealing surface of the one abutting edge of another section, and each section having longitudinal side flanges each adapted to be bolted to the corresponding flange on an adjacent section, the combination comprising: means defining a plurality of bolt holes in the side flanges of each section, the pattern of said holes being identical in all said flanges and each of said hole patterns being unsymmetrical with respect to the transverse center line of each section, whereby if the sleeve sections are improperly assembled about a pipe so that the packings on two adjacent sections abut each other and the sealing surfaces on two adjacent sections abut each other, bolts cannot be inserted through the bolt holes in adjacent flanges.

2. The structure defined in claim 1 in which each hole pattern comprises a longitudinal line of equally-spaced holes.

3. The structure defined in claim 1 in which each hole pattern comprises a longitudinal line of holes, some of which are symmetrically arranged with respect to the transverse centerline.

References Cited in the file of this patent
UNITED STATES PATENTS

| | | |
|---|---|---|
| 631,867 | Beaver | Aug. 29, 1899 |
| 732,400 | Dresser | June 30, 1903 |
| 896,333 | Smith | Aug. 18, 1908 |
| 1,782,567 | Farmer | Nov. 25, 1930 |
| 1,888,241 | Rah | Nov. 22, 1932 |
| 1,911,126 | Pfefferle | May 23, 1933 |
| 2,230,287 | Curtis | Feb. 4, 1941 |
| 2,635,552 | Dale | Apr. 21, 1953 |
| 2,640,471 | Haltenberger | June 2, 1953 |
| 2,690,193 | Smith | Sept. 28, 1954 |
| 2,748,454 | Compton | June 5, 1956 |